No. 808,732. PATENTED JAN. 2, 1906.
C. H. A. DISSINGER.
CHANGE GEARING.
APPLICATION FILED OCT. 1, 1903.
2 SHEETS—SHEET 1.
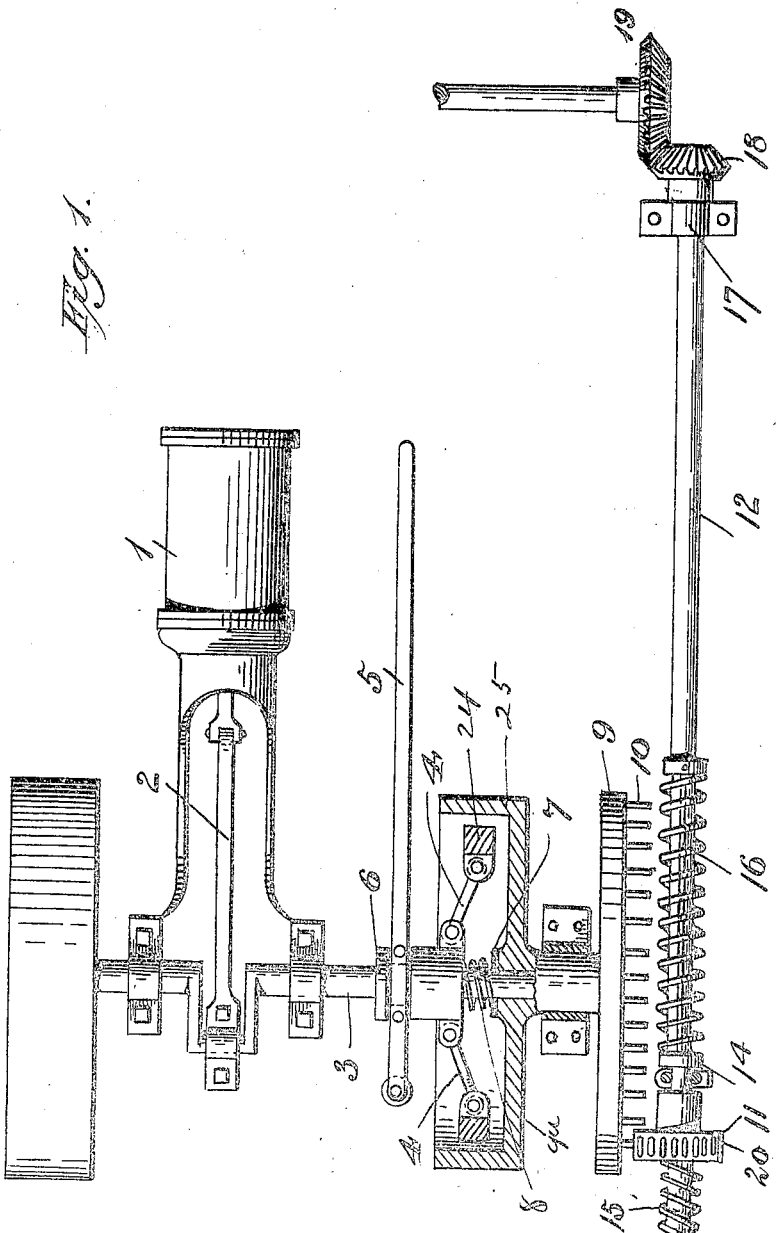

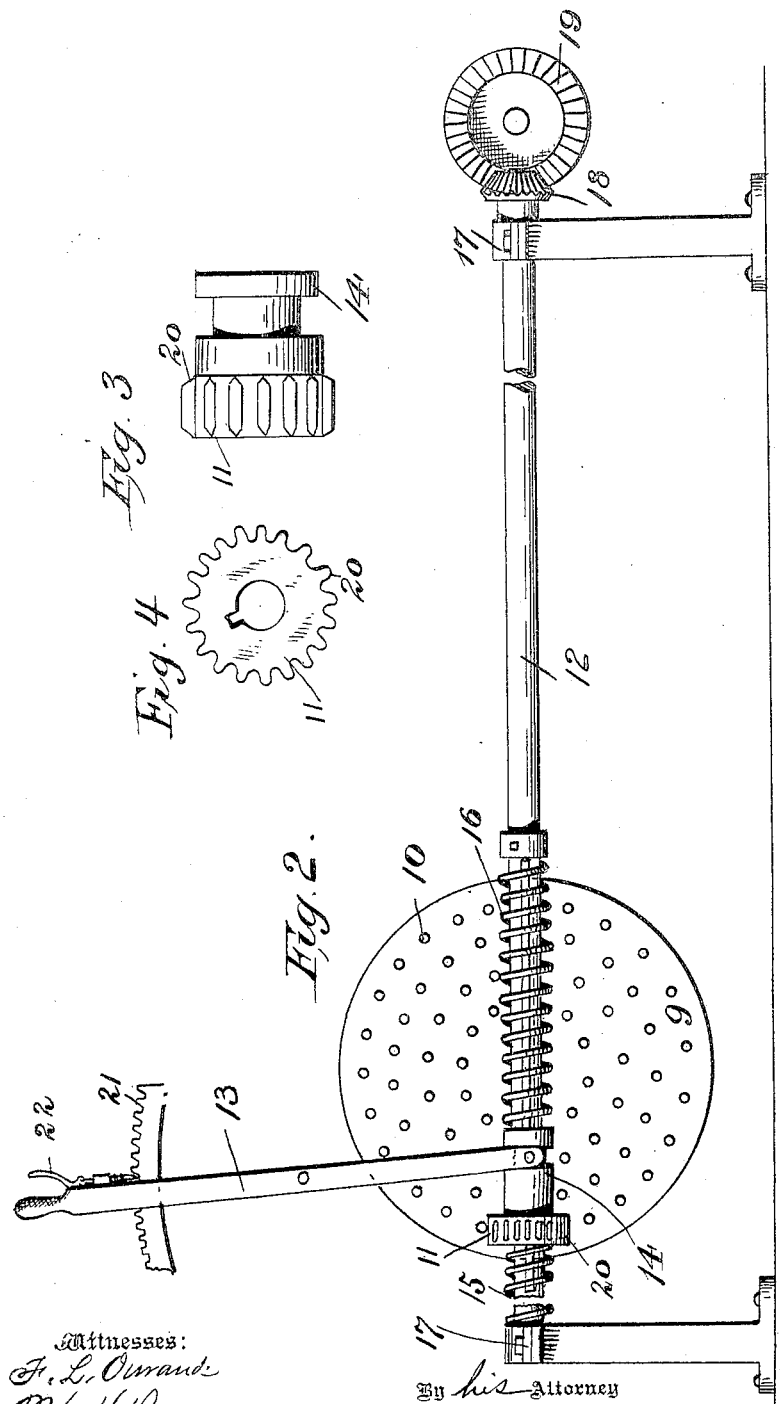

UNITED STATES PATENT OFFICE.

CASTOR H. A. DISSINGER, OF WRIGHTSVILLE, PENNSYLVANIA.

CHANGE-GEARING.

No. 808,732.      Specification of Letters Patent.      Patented Jan. 2, 1906.

Application filed October 1, 1903. Serial No. 175,293.

*To all whom it may concern:*

Be it known that I, CASTOR H. A. DISSINGER, a citizen of the United States, residing at Wrightsville, in the county of York and State of Pennsylvania, have invented certain new and useful Improvements in Change-Gearing, of which the following is a specification.

My invention relates to change-gearing for changing or reversing power for use in automobiles or other machines desired, and has for its object the production of a device of said character which will be simple in construction, effective in operation, and all jar in the parts be eliminated.

In the drawings forming a part of this specification, and in which like symbols of reference represent corresponding parts in the several views, Figure 1 is a plan view of an engine with my device connected therewith. Fig. 2 is a longitudinal view of the device; Fig. 3, a side view of the gear for reversing, and Fig. 4 a front view of the same.

1 represents the engine furnishing the power; 2, the piston-rod thereof; 3, the engine-shaft; 4, a clutch on said shaft, and 5 a hand-lever connected to a sliding collar 6, keyed to shaft 3 to operate clutch 4 and throw the device into or out of operation. Clutch 4 has shoes 24 that operate in a flange 25.

7 is a collar working back and forth on the engine-shaft and being keyed to said shaft so as to have only longitudinal play.

8 is a spring to automatically throw the clutch out of operation, the same lying between the clutch and collar, its ends being fast to each.

9 is a wheel integrally connected with a disk 9ª and loose on shaft 3, the same having a series of concentric pins 10, which are adapted to be engaged by a pinion 11 on a shaft 12, said pinion 11 being keyed onto said shaft, so as to have only longitudinal play on the same and be operated by a lever 13, embracing a channeled collar 14, connected to pinion 11. The pinion 11 may thus be shifted on shaft 12. The teeth of pinion 11 are beveled or pointed, as at 20, so as to more readily engage pins 10.

15 and 16 are springs on shaft 12, lying on both sides of the pinion 11, the function of the same being to normally hold the pinion 11 in the center of wheel 9, and thus automatically throw the device out of operation when lever 13 is released.

21 is the usual segmental rack, and 22 a pawl working in the same.

The shaft 12 is journaled in bearings 17 and is provided with a pinion 18, engaging a pinion 19, the same conveying the power to the point desired.

The operation is as follows: When it is desired to change the speed, the lever 13 is operated so as to shift pinion 11 from one row of pins to the other, and when it is desired to reverse the device it is done by passing the pinion 11 beyond the center of wheel 9, and of course the various speeds may be obtained on said side by shifting to the various circles.

Having now fully described my invention, what I claim as new, and desire to secure by Letters Patent, is—

1. In a change-gearing, a wheel provided with a series of concentric pins, an engine-shaft, a clutch-drum and clutch member on said shaft, said clutch-drum having connection with the pin-provided wheel, a pinion adapted to engage the pins, a lever for shifting the pinion, and springs to automatically throw the device out of operation when the lever is released.

2. In a change-gearing, a driving-shaft, a wheel provided with a series of concentric pins, a clutch to throw the same into or out of operation, a pinion to engage the pins, a shaft upon which the pinion is journaled, a lever for operating the pinion, and springs to throw the device out of operation when the lever is released.

In testimony whereof I affix my signature in presence of two witnesses.

CASTOR H. A. DISSINGER.

Witnesses:
   HARRY F. WAILS,
   U. GRANT DISSINGER.